United States Patent
Kaltenbach et al.

(10) Patent No.: US 10,380,034 B2
(45) Date of Patent: Aug. 13, 2019

(54) CACHE RETURN ORDER OPTIMIZATION

(71) Applicant: INTERNATIONAL BUSINESS MACHINES CORPORATION, Armonk, NY (US)

(72) Inventors: Markus Kaltenbach, Holzgerlingen (DE); Ulrich Mayer, Schoenbuch (DE); Siegmund Schlechter, Lorch (DE); Maxim Scholl, Willich (DE)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 15/649,990

(22) Filed: Jul. 14, 2017

(65) Prior Publication Data

US 2019/0018791 A1    Jan. 17, 2019

(51) Int. Cl.
*G06F 9/30* (2018.01)
*G06F 9/38* (2018.01)
(Continued)

(52) U.S. Cl.
CPC ...... *G06F 12/1054* (2013.01); *G06F 9/30043* (2013.01); *G06F 9/3836* (2013.01); *G06F 12/0855* (2013.01); *G06F 2212/60* (2013.01)

(58) Field of Classification Search
CPC ............ G06F 3/00; G06F 3/06–3/0689; G06F 5/00–5/16; G06F 9/00–9/548; G06F 11/00–11/3696; G06F 12/00–12/16; G06F 13/00–13/4295; G06F 17/00–17/5095; G06F 21/00–21/88; G06F 2003/0691–2003/0698; G06F 2009/3883; G06F 2009/45562–2009/45595; G06F 2201/00–2201/885; G06F 2206/00–2206/20; G06F 2209/00–2209/549; G06F 2211/00–2211/902;
(Continued)

(56) References Cited

U.S. PATENT DOCUMENTS 3,626,427 A * 12/1971 MacSorley ............. G06F 15/78
 712/228
4,484,294 A * 11/1984 Noss .................... G05B 19/427
 318/568.14
(Continued)

OTHER PUBLICATIONS

The Cache Guide; Renn, Brian; Dec. 12, 1998; retrieved from https://www.cs.umd.edu/~meesh/cmsc411/website/projects/ramguide/cache/cache.html#ercwf on Oct. 26, 2018 (Year: 1998).*
(Continued)

*Primary Examiner* — Daniel C. Chappell
(74) *Attorney, Agent, or Firm* — Kristofer L. Haggerty

(57) ABSTRACT

Improving operation of a processing unit to access data within a cache system. A first fetch request and one or more subsequent fetch requests are accessed in an instruction stream. An address of data sought by the first fetch requested is obtained. At least a portion of the address of data sought by the first fetch request in inserted in each of the one or more subsequent fetch requests. The portion of the address inserted in each of the one or more subsequent fetch requests is utilized to retrieve the data sought by the first fetch request first in order from the cache system.

20 Claims, 5 Drawing Sheets

(51) Int. Cl.
*G06F 12/0855* (2016.01)
*G06F 12/1045* (2016.01)

(58) Field of Classification Search
CPC .......... G06F 2212/00–2212/7211; G06F 2213/00–2213/4004; G06F 2216/00–2216/17; G06F 2221/00–2221/2153
See application file for complete search history.

(56) References Cited

U.S. PATENT DOCUMENTS

| | | | | |
|---|---|---|---|---|
| 5,566,306 A * | 10/1996 | Ishida | G06F 13/18 | 710/27 |
| 5,652,858 A * | 7/1997 | Okada | G06F 9/30043 | 710/52 |
| 5,668,975 A * | 9/1997 | Coddington | G06F 13/18 | 711/151 |
| 5,727,232 A * | 3/1998 | Iida | G06F 3/061 | 710/56 |
| 5,732,244 A * | 3/1998 | Gujral | G06F 12/0831 | 709/238 |
| 5,754,876 A * | 5/1998 | Tamaki | G06F 9/30043 | 710/52 |
| 5,809,340 A * | 9/1998 | Bertone | G06F 12/0831 | 709/233 |
| 5,809,560 A * | 9/1998 | Schneider | G06F 12/0862 | 711/202 |
| 5,828,860 A * | 10/1998 | Miyaoku | G06F 9/30043 | 712/207 |
| 5,845,145 A * | 12/1998 | James | G06F 13/4013 | 710/1 |
| 5,854,911 A * | 12/1998 | Watkins | H04Q 11/0478 | 712/207 |
| 5,892,915 A * | 4/1999 | Duso | G11B 27/10 | 709/219 |
| 6,038,651 A * | 3/2000 | VanHuben | G06F 9/505 | 712/17 |
| 6,415,355 B1 * | 7/2002 | Hirofuji | G06F 11/1076 | 710/22 |
| 7,076,619 B2 * | 7/2006 | Hsu | G06F 3/0613 | 711/111 |
| 7,509,484 B1 | 3/2009 | Golla et al. | | |
| 7,664,918 B2 * | 2/2010 | Ali | G06F 9/3802 | 711/118 |
| 7,809,889 B2 | 10/2010 | Nychka et al. | | |
| 8,006,042 B2 * | 8/2011 | Lauterbach | G06F 12/121 | 711/141 |
| 8,559,439 B1 | 10/2013 | Dongare | H04L 47/34 | 370/394 |
| 8,590,001 B2 * | 11/2013 | Rowlands | H04N 21/21815 | 710/74 |
| 8,930,629 B2 | 1/2015 | Ghai et al. | | |
| 9,063,794 B2 | 6/2015 | Morita et al. | | |
| 9,274,959 B2 | 3/2016 | Habermann et al. | | |
| 9,319,265 B2 * | 4/2016 | Bloomstein | H04L 29/08801 | |
| 9,418,013 B2 | 8/2016 | Anantaraman et al. | | |
| 9,612,960 B2 * | 4/2017 | Whalley | G06F 12/0811 | |
| 2001/0044881 A1 | 11/2001 | Fu et al. | | |
| 2001/0052045 A1 * | 12/2001 | Arcoleo | G11C 7/1018 | 711/1 |
| 2002/0095552 A1 * | 7/2002 | Kavipurapu | G06F 12/0897 | 711/118 |
| 2002/0166028 A1 * | 11/2002 | Shaw | G06F 12/0859 | 711/118 |
| 2003/0005239 A1 * | 1/2003 | Dover | G06F 13/1642 | 711/150 |
| 2003/0196044 A1 * | 10/2003 | Ramirez | G06F 9/3802 | 711/137 |
| 2004/0003179 A1 * | 1/2004 | Shirahige | G06F 12/0862 | 711/137 |
| 2004/0117441 A1 * | 6/2004 | Liu | G06F 12/0888 | 709/203 |
| 2004/0177155 A1 * | 9/2004 | Enokida | G06T 9/007 | 709/236 |
| 2004/0205300 A1 * | 10/2004 | Bearden | G06F 12/0862 | 711/137 |
| 2005/0253858 A1 * | 11/2005 | Ohkami | G06F 12/0862 | 345/531 |
| 2006/0224870 A1 * | 10/2006 | Tago | G06F 9/3804 | 712/238 |
| 2007/0011382 A1 * | 1/2007 | Roever | G06F 13/1615 | 710/240 |
| 2008/0189487 A1 * | 8/2008 | Craske | G06F 12/0859 | 711/125 |
| 2009/0006808 A1 * | 1/2009 | Blumrich | G06F 15/17337 | 712/12 |
| 2009/0024796 A1 | 1/2009 | Nychka et al. | | |
| 2009/0217015 A1 * | 8/2009 | Alexander | G06F 9/3804 | 712/239 |
| 2010/0037026 A1 * | 2/2010 | Hardy | G06F 12/0859 | 711/133 |
| 2010/0262720 A1 | 10/2010 | Daly, Jr. et al. | | |
| 2011/0202708 A1 * | 8/2011 | Ash | G06F 12/0866 | 711/103 |
| 2011/0296110 A1 * | 12/2011 | Lilly | G06F 13/1668 | 711/118 |
| 2012/0137078 A1 * | 5/2012 | Biswas | G06F 12/0893 | 711/130 |
| 2013/0111186 A1 | 5/2013 | Hickey et al. | | |
| 2013/0145102 A1 | 6/2013 | Wang et al. | | |
| 2014/0047155 A1 * | 2/2014 | Zheng | G06F 13/4059 | 710/310 |
| 2014/0258636 A1 * | 9/2014 | Dong | G06F 12/128 | 711/133 |
| 2015/0127907 A1 | 5/2015 | Fahim et al. | | |
| 2015/0378919 A1 | 12/2015 | Knantaraman et al. | | |
| 2016/0306566 A1 * | 10/2016 | Lu | G06F 13/385 | |
| 2017/0010974 A1 | 1/2017 | Steely, Jr. et al. | | |
| 2017/0148133 A1 * | 5/2017 | Sumihiro | G06F 3/0604 | |
| 2017/0185528 A1 * | 6/2017 | Hansson | G06F 12/1009 | |

OTHER PUBLICATIONS

RAPID: read acceleration for improved performance and endurance in MLC/TLC NVMs; Palangappa et al.; Proceedings of the International Conference on Computer-Aided Design, Article No. 67; Nov. 5-8, 2018 (Year: 2018).*
Return Data Interleaving for Multi-Channel Embedded CMPs Systems; Hong et al.; IEEE Transactions on Very Large Scale Integration Systems, col. 20, iss. 7, pp. 1351-1354; Jul. 2012 (Year: 2012).*
Berg, "Cache Prefetching", Technical Report UW-CSE, Feb. 2, 2004, pp. 1-29.
IBM, List of IBM Patents or Patent Applications Treated as Related, Appendix P, dated Jan. 26, 2018, 2 pages.
Pending U.S. Appl. No. 15/878,450, filed Jan. 24, 2018, entitled: "Cache Return Order Optimization", 15 pages.

* cited by examiner

CACHE RETURN ORDER OPTIMIZATION

BACKGROUND

The present invention relates generally to the field of computer memory cache access and instruction pipelining, and more particularly to improving processor efficiency in memory caching by modifying addresses of fetch requests to maintain data return order.

BRIEF SUMMARY

Embodiments of the present invention disclose a method, system, and computer program product for improving operation of a processing unit to access data within a cache system. A first fetch request and one or more subsequent fetch requests are accessed in an instruction stream. An address of data sought by the first fetch requested is obtained. At least a portion of the address of data sought by the first fetch request in inserted in each of the one or more subsequent fetch requests. The portion of the address inserted in each of the one or more subsequent fetch requests is utilized to retrieve the data sought by the first fetch request first in order from the cache system.

DETAILED DESCRIPTION

Nearly every modern processor uses memory caching to access more frequently needed data in the fastest manner possible, rather than always directly accessing main system memory. First, second, third, and even, in some processor designs, fourth and even higher level caches each present fast, and progressively larger locations from the processor to store and write data, and even though each cache level is more distant from the microprocessor, all cache levels are closer and allow faster access than accesses from main system memory. The goal of the caches' availability very close to the processor, is to improve memory search times for frequently needed data, with the end result of a reduction of the time needed to execute.

Cache access, as with other computer processes, occurs via pipelined instructions executed by the processor. Each "stream" of pipelined instructions may include, for example, one or more "fetch" requests, in which data is sought from the cache, as well as various other steps. If data is sought from a certain cache during a fetch request, but is not found, a search in a higher level cache may be scheduled by the processor during a subsequent "fetch" request.

The stream of pipelined instructions is broken up by a processing unit to multiple independent fetch requests as it is executed, but the data requested by each independent fetch request may exist in different levels of the cache system. It is possible, therefore, that the first fetch request in the stream of pipelined instructions seeks data existing in a higher level of the cache, and, for various reasons, access to this cache level occurs at a later time than access to a lower cache level where the remainder of the data sought by subsequent fetch requests reside. This causes data return order to become askew which leads to slowdowns and even stalls in program execution, while waiting for the sought data from an early fetch request to be returned.

Presented is a system, method, and computer program product for improving operation of the processing unit by maintaining data return order when executing multiple fetch requests from a multilevel cache.

Figure 1A:
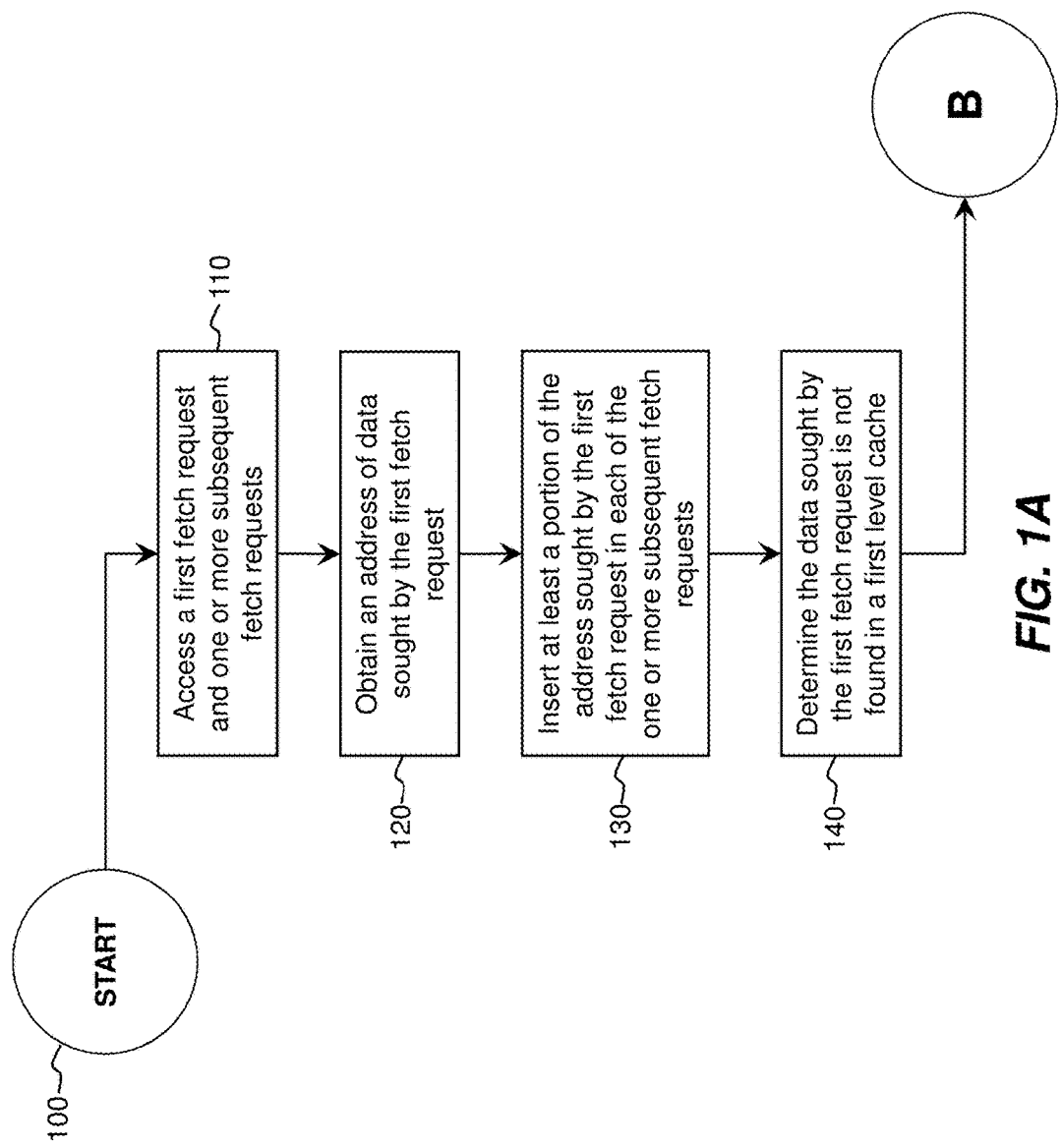
FIGS. 1A and 1B are a flowchart illustrating operational steps to maintain data return order, in an embodiment of the invention.
Figure 1B:
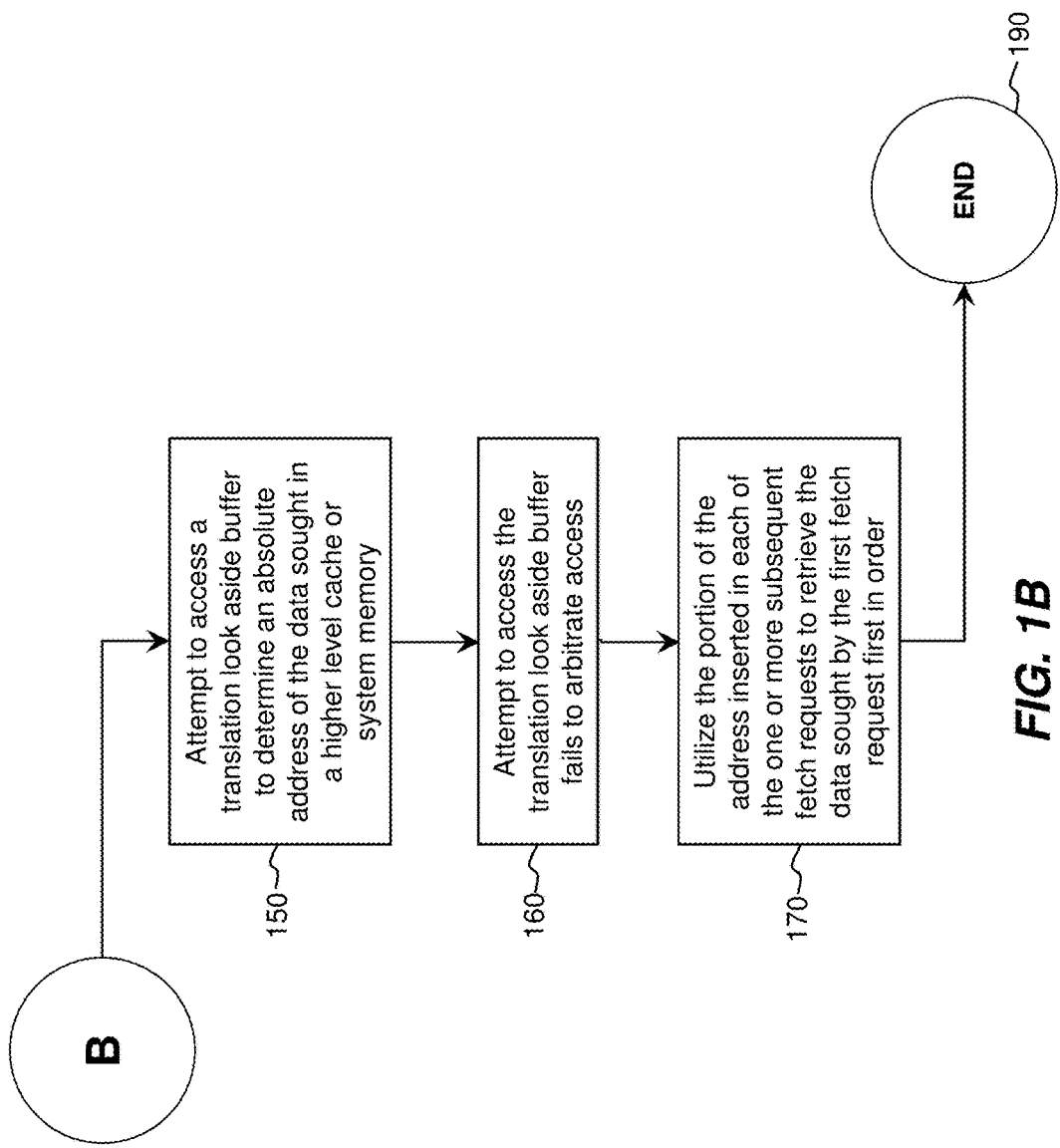

FIGS. 1A and 1B are a flowchart illustrating operational steps to maintain data return order, in an embodiment of the invention. At step 100, execution begins. At step 110, a first fetch request and one or more subsequent fetch requests are accessed from an instruction stream. At step 120, an address of data sought by the first fetch request is obtained for further use. For simplicity's sake, shortened addresses such as x40 are used throughout. At step 130, at least a portion of the address sought by the first fetch request is inserted in each of the one or more subsequent fetch requests. At step 140, a determination is made that the data sought by the first fetch request is not found in a first level cache associated with the processing unit.

At step 150, an attempt to access a translation look aside buffer is made to determine an absolute address of the data sought in a higher level cache or system memory. Alternately, and depending upon the location of the data and system architecture, a logical address may be utilized in seeking the same data. At step 160, an attempt to access the translation look aside buffer fails to arbitrate access. At step 170, and as execution of pipeline stages proceeds, the portion of the address inserted into each of the one or more subsequent fetch requests is utilized to confirm that the data requested by the first fetch request is actually retrieved first. Although simplified addresses such as x40 are used herein, in practice a few low order bits of the address responsible for data return may be inserted. Execution may then proceed to return subsequent data to transfer to a cache line in the first level cache, with the full cache line of data utilized in subsequent execution by the processing unit. The advantage of the present invention is the returning of the first requested data first in time, so as to allow execution to proceed in the fastest manner possible. Execution proceeds to end 190, but may restart immediately and return to start 100.

Figure 2:
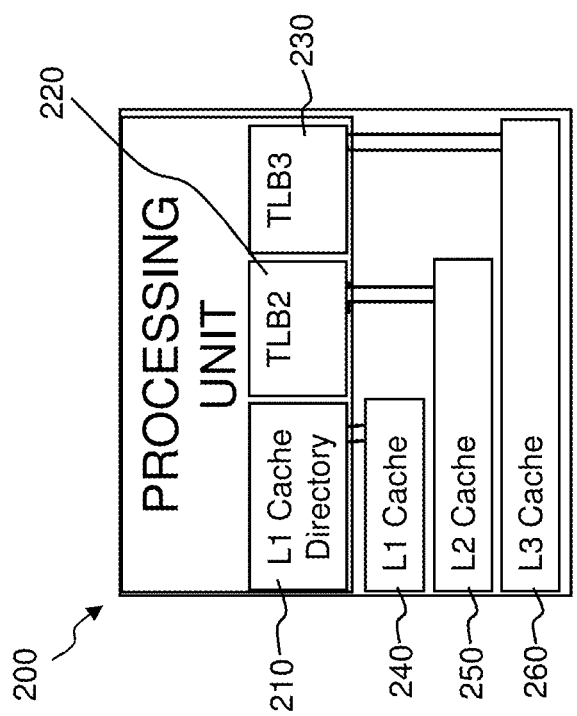
FIG. 2 is a functional block diagram displaying an environment for cache return order optimization, in an embodiment of the invention.

FIG. 2 is a functional block diagram displaying an environment for cache return order optimization, in an embodiment of the invention. The processing unit is displayed 200. Displayed also is an L1 cache directory 210, translation look aside buffer 2 ("TLB2") 220, and translation look aside buffer 3 ("TLB3") for providing access, respectively, to an L1 cache 240, an L2 cache 250, and an L3 cache 260. The processing unit 200 utilizes for fast access the L1 cache 240, the L2 cache 250, and the L3 cache 260 (versus direct accesses to system memory). The L1 cache 240 is closest to the processing unit 200, with the fastest data transfer rate between the L1 cache 240 and the processing unit 200, but with the smallest amount of storage space available. The L2 cache 250 is an intermediate distance from the processing unit 200, with an intermediate data transfer rate between the L2 cache 250 and the processing unit 200, and an intermediate amount of storage space available. The L3 cache 260 is the farthest distance from the processing unit 200, with the slowest data transfer rate between the processing unit 200 and the L3 cache 260, but the largest amount of storage space available.

The L1 cache directory 210 provides access to information residing in the L1 cache 240. The L1 cache directory 210 also identifies whether data is present within the L1 cache 240 (i.e. whether a fetch request will "hit" or "miss"). If data is not present to respond to a fetch attempted from the processing unit 200, the L1 cache directory 210 may identify which higher level cache to access of the L2 cache 250 and the L3 cache 260. Data in the L1 cache 240 is accessible via logical addresses (also referred to as "virtual addresses"), and may operate on cache line granularity. Translation look aside buffer 2 220 provides access to information residing in the L2 cache 250. Translation look aside buffer 3 230 provides access to information residing in the L3 cache 260. Data in the L2 cache 250 and the L3 cache 260 are accessible via absolute addresses (also referred to as "physical addresses"). The translation look aside buffer 2 220 and translation look aside buffer 3 230 service many potential requestors, including the processing unit 200, an instruction cache, multiple load-store units, etc., but are only single-ported so cannot service multiple requests simultaneously. Access to the TLB2 220 and TLB3 230 must therefore be successfully "arbitrated" by the processing unit 200 in order to process a fetch request.

When accessing and executing a first fetch request and subsequent fetch requests, the processing unit 200 first accesses the L1 cache directory 210 to see if the data is present in the L1 cache directory 210. If the processing unit 200 determines the data requested by the first fetch request is not present in the L1 cache 240, the L1 cache directory 210 may indicate that the data is located in the L2 cache 250 or the L3 cache 260. The processing unit 200 may then access TLB2 220 or TLB3 230 to determine the address of the data.

If the data is located in the L2 cache 250 or L3 cache 260, the data requested by the fetch request may be loaded after retrieval into a cache line of the L1 cache 240, with an entire line being loaded into the cache line of the L1 cache 240 to support fast continuation (as requested by one or more subsequent fetch requests), although only the data requested by the first fetch request is truly necessary. Data following the first fetch request is loaded in the pre-determined order, with "wrap-around" supported to fill the cache line of the L1 cache 240. If, for example, data requested at x80 was requested in the first fetch request, x90, xA0, xB0, xC0, xD0, xE0, xF0, x00, x10, x20, x30, x40, x50, x60, x70 are also subsequently requested by subsequent fetch requests (with wrap-around occurring at x00 . . . ) to fill the cache line of the L1 cache 240, and support fast availability of potentially useful data in the vicinity of the first fetch request at x80 via the L1 cache 240 after retrieval.

Depending upon how the first fetch request and one or more subsequent fetch requests in an instruction stream are processed by the TLB2 220 and TLB3 230, and where arbitration is granted first for the subsequent fetch requests (based upon other requests from the load-store unit, etc.), it is possible information requested in subsequent fetch requests is loaded first into the L1 cache 240, while waiting for data in the first fetch request which was truly necessary to begin with. By inserting at least a portion of the address of the data sought by the first fetch request in each of the subsequent fetch requests, the presently disclosed invention confirms that the data in the first fetch requests and subsequent requests is loaded in the correct order, to maximize speed and minimize power consumption by the processing unit 200. This process is further discussed in connection with FIG. 3.

Figure 3A:
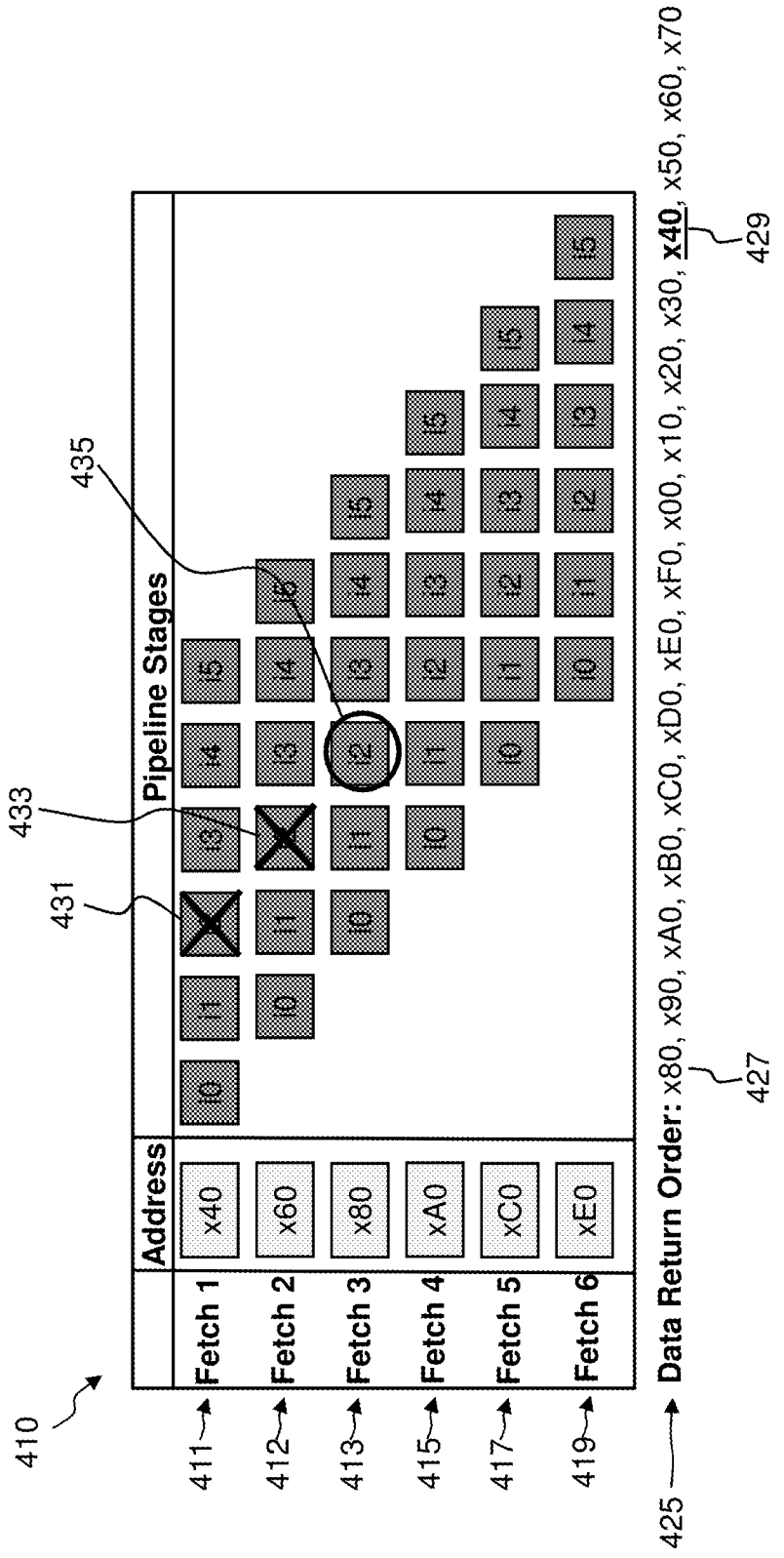
FIGS. 3A and 3B display a process of execution of cache return order optimization, in accordance with an embodiment of the invention.
Figure 3B:
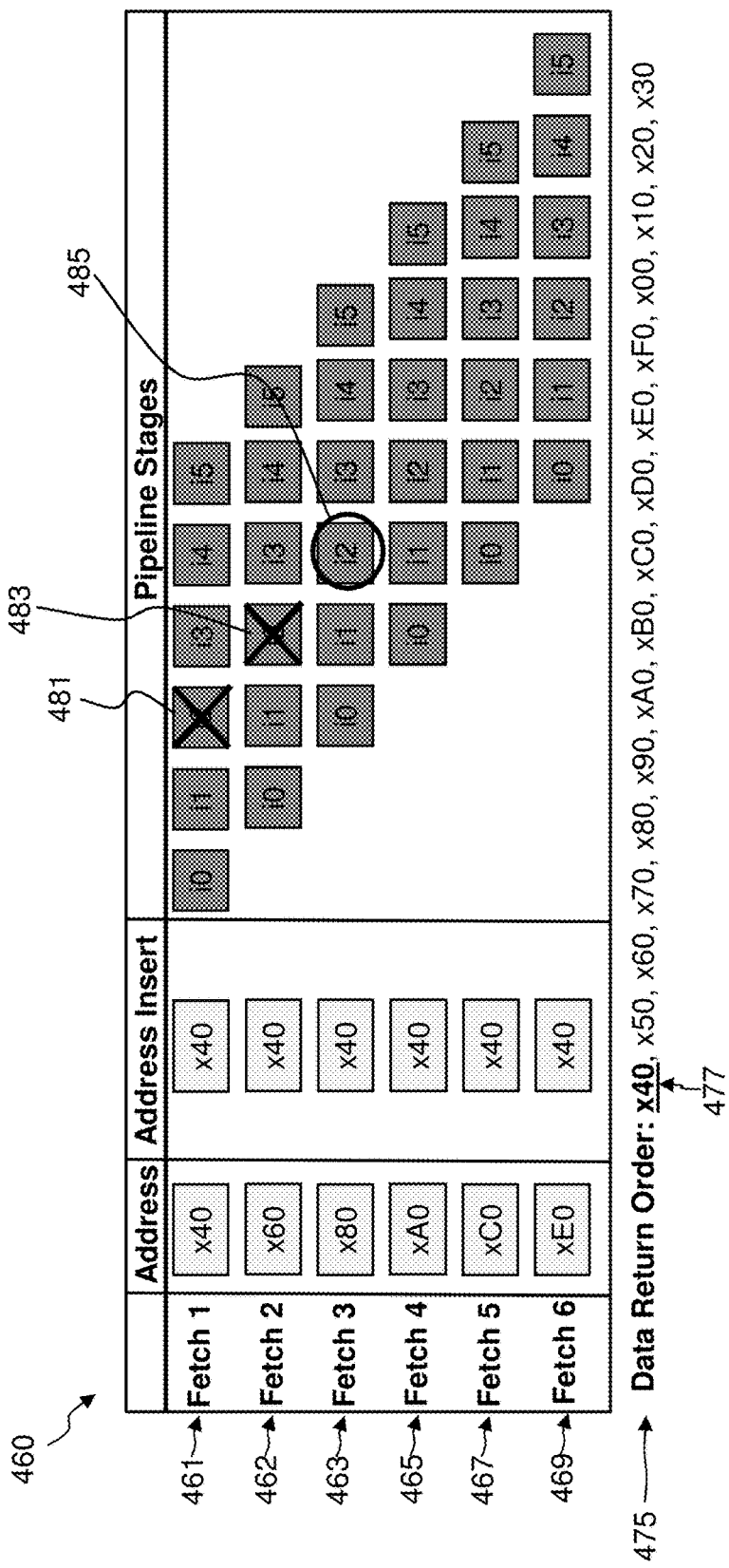

FIGS. 3A and 3B display a process of execution of cache return order optimization, in accordance with an embodiment of the invention. Displayed 410 is a process of execution without the benefit of the presently disclosed invention. As displayed 411-419, a first fetch request 1 411 and subsequent fetch requests 412, 413, 415, 417, and 419 are being executed. The first fetch request 1 411 is requesting data at address x40. Subsequent fetch request 2 412 is requesting data at address x60. Subsequent fetch request 3 413 is requesting data at address x80. Subsequent fetch request 4 415 is requesting data at xA0. Subsequent fetch request 5 417 is requesting data at xC0. Subsequent fetch request 6 419 is requesting data at xE0.

In this process of execution 410, fetch requests are executed at instruction cycle i2. First fetch request 1 411 would execute at instruction cycle i2 (431), but due to not arbitrating access to a translation look aside buffer, the first fetch request 1 411 is not executed. Subsequent fetch request 2 412 would execute at instruction cycle i2 (433), but again due to not arbitrating access to the translation look aside buffer, subsequent fetch request 2 412 is not executed. Subsequent fetch request 3 413 executes at instruction cycle i2 (435), and successfully arbitrates access to the translation look aside buffer. Data at address x80 is therefore successfully returned by subsequent fetch request 3 413. Subsequent fetches 415, 417, 419 successfully arbitrate access to the translation look aside buffer, and wrap around occurs to return the remainder of data.

The data return order is displayed 425, as x80, x90, xA0, xB0, xC0, xD0, xE0, xF0, x00, x10, x20, x30, x40, x50, x60, x70. Thus, even though the first fetch request 1 411 was for data at x40, the first data returned is at x80, as displayed 427. The data at x40 was returned 429, much later, after receiving a restart indication (not shown here). Multiple fetches and other instructions may have been executed in the interim, leading to systematic delays, stalls, and possibly increased power consumption due to not receiving the first requested data x40 first.

Displayed 460 is a process of execution with the benefit of the presently disclosed invention. As displayed 461-469, a first fetch request 1 461 and subsequent fetch requests 462, 463, 465, 467, and 469 are being executed. The first fetch request 1 461 is requesting data at address x40. Since the first fetch request 1 461 is requesting data at x40, in the presently disclosed invention, the address of data sought by the first fetch request 1 461 is inserted in all subsequent fetch requests 462, 463, 465, 467, 469 to maintain order of the retrieved data when retrieving from higher level caches such as the L2 cache 250 or L3 cache 260. Subsequent fetch request 2 462 is requesting data at address x60. Subsequent fetch request 3 463 is requesting data at address x80. Subsequent fetch request 4 465 is requesting data at xA0. Subsequent fetch request 5 467 is requesting data at xC0. Subsequent fetch request 6 469 is requesting data at xE0. Address insert x40 remains associated with all subsequent fetch requests 462-469, to ascertain that x40 is retrieved first.

In this process of execution 460, as previously with 410, fetch requests are executed at instruction cycle i2. First fetch request 1 461 would execute at instruction cycle i2 (481), but due to not arbitrating access to a translation look aside buffer, the first fetch request 1 461 is not executed. Subsequent fetch request 2 462 would execute at instruction cycle i2 (483), but again due to not arbitrating access to the translation look aside buffer, subsequent fetch request 2 462 is not executed. Subsequent fetch request 3 463 executes at instruction cycle i2 (485), and successfully arbitrates access to the translation look aside buffer. Data at address x40 is successfully returned by subsequent fetch request 3 463, since the address insert is utilized in fetch request 3 463.

Subsequent fetches 465, 467, 469 successfully arbitrate access to the translation look aside buffer, and wrap around occurs to return the remainder of data.

The data return order is displayed 475, as x40, x50, x60, x70, x80, x90, xA0, xB0, xC0, xD0, xE0, xF0, x00, x10, x20, x30. This is the correct order, with the first requested data x40 returned first in the data return order 475, as displayed 477. The fewest possible number of fetches have been executed, leading to a minimum of system delay. The returned data may be utilized in a line of the L1 cache 240, or in another way based upon system architecture.

Based on the foregoing, a computer system, method and program product have been disclosed for cache return order optimization. However, numerous modifications and substitutions can be made without deviating from the scope of the present invention. The embodiment(s) herein may be combined, altered, or portions removed. Therefore, the present invention has been disclosed by way of example and not limitation.

What is claimed is:

1. A method of improving operation of a processing unit to access data within a cache system, the method comprising:
   accessing a first fetch request and one or more subsequent fetch requests in an instruction stream;
   obtaining an address of data sought by the first fetch request;
   inserting at least a portion of the address of data sought by the first fetch request in each of the one or more subsequent fetch requests seeking data located in the cache system or main system memory, the memory address inserted by inserting bits of the memory address in the subsequent fetch requests; and
   utilizing the portion of the address inserted in each of the one or more subsequent fetch requests in place of the memory address contained within each of the one or more subsequent fetch requests to retrieve the data sought by the first fetch request first in order from the cache system in maintaining data return order.

2. The method of claim 1, wherein the processing unit determines the data sought by the first fetch request is not found in a first level cache.

3. The method of claim 2, wherein the processing unit, upon determining that the data sought by the first fetch request is not found in the first level cache, attempts to access a translation look aside buffer to determine an absolute address of the data sought in a higher level cache or system memory.

4. The method of claim 3, wherein the attempt to access the translation look aside buffer fails to arbitrate access.

5. The method of claim 4, wherein the address of the data sought by the first fetch is used to retrieve the data sought via repetition of the first fetch request.

6. The method of claim 3, wherein the obtained address of data sought by the first fetch request is a logical address and the translation look aside buffer determines the absolute address by providing the absolute address corresponding to the logical address, the absolute address used to access data in the higher level cache.

7. The method of claim 1, wherein the first fetch request and the one or more subsequent fetch requests occur in a stream of pipelined instructions broken up by the processing unit into multiple independent fetch requests during execution to seek data in a cache line of the cache system.

8. A computer program product using a processing unit to improve operation of accessing data within a cache system, the computer program product comprising:
   accessing a first fetch request and one or more subsequent fetch requests in an instruction stream;
   obtaining an address of data sought by the first fetch request;
   inserting at least a portion of the address of data sought by the first fetch request in each of the one or more subsequent fetch requests seeking data located in the cache system or main system memory, the memory address inserted by inserting bits of the memory address in the subsequent fetch requests; and
   utilizing the portion of the address inserted in each of the one or more subsequent fetch requests in place of the memory address contained within each of the one or more subsequent fetch requests to retrieve the data sought by the first fetch request first in order from the cache system in maintaining data return order.

9. The computer program product of claim 8, wherein the processing unit determines the data sought by the first fetch request is not found in a first level cache.

10. The computer program product of claim 9, wherein the processing unit, upon determining that the data sought by the first fetch request is not found in the first level cache, attempts to access a translation look aside buffer to determine an absolute address of the data sought in a higher level cache or system memory.

11. The computer program product of claim 10, wherein the attempt to access the translation look aside buffer fails to arbitrate access.

12. The computer program product of claim 11, wherein the address of the data sought by the first fetch is used to retrieve the data sought via repetition of the first fetch request.

13. The computer program product of claim 10, wherein the obtained address of data sought by the first fetch request is a logical address and the translation look aside buffer determines the absolute address by providing the absolute address corresponding to the logical address, the absolute address used to access data in the higher level cache.

14. The computer program product of claim 8, wherein the first fetch request and the one or more subsequent fetch requests occur in a stream of pipelined instructions broken up by the processing unit into multiple independent fetch requests during execution to seek data in a cache line of the cache system.

15. A computer system for improving operation of a processing unit accessing data within a cache system, the computer system comprising:
   one or more computer processors, one or more computer-readable storage media, and program instructions stored on one or more of the computer-readable storage media for execution by at least one of the one or more processors, the program instructions, when executed by a computer, cause the computer to perform a method comprising:
      accessing a first fetch request and one or more subsequent fetch requests in an instruction stream;
      obtaining an address of data sought by the first fetch request;
      inserting at least a portion of the address of data sought by the first fetch request in each of the one or more subsequent fetch requests seeking data located in the cache system or main system memory, the memory address inserted by inserting bits of the memory address in the subsequent fetch requests; and
      utilizing the portion of the address inserted in each of the one or more subsequent fetch requests in place of the memory address contained within each of the one or more subsequent fetch requests to retrieve the data sought by the first fetch request first in order from the cache system in maintaining data return order.

16. The computer system of claim 15, wherein the processing unit determines the data sought by the first fetch request is not found in a first level cache.

17. The computer system of claim 16, wherein the processing unit, upon determining that the data sought by the first fetch request is not found in the first level cache, attempts to access a translation look aside buffer to determine an absolute address of the data sought in a higher level cache or system memory.

18. The computer system of claim 17, wherein the attempt to access the translation look aside buffer fails to arbitrate access.

19. The computer system of claim 18, wherein the address of the data sought by the first fetch is used to retrieve the data sought via repetition of the first fetch request.

20. The computer system of claim 17, wherein the obtained address of data sought by the first fetch request is a logical address and the translation look aside buffer determines the absolute address by providing the absolute address corresponding to the logical address, the absolute address used to access data in the higher level cache.

* * * * *